United States Patent
Manamohan et al.

(10) Patent No.: US 11,605,013 B2
(45) Date of Patent: Mar. 14, 2023

(54) SYSTEM AND METHOD OF DECENTRALIZED MACHINE LEARNING USING BLOCKCHAIN

(71) Applicant: Hewlett Packard Enterprise Development LP, Houston, TX (US)

(72) Inventors: Sathyanarayanan Manamohan, Chennai (IN); Krishnaprasad Lingadahalli Shastry, Bangalore (IN); Vishesh Garg, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 458 days.

(21) Appl. No.: 16/163,159

(22) Filed: Oct. 17, 2018

(65) Prior Publication Data
US 2019/0332955 A1  Oct. 31, 2019

(30) Foreign Application Priority Data
Apr. 30, 2018  (IN) .............................. 201841016309

(51) Int. Cl.
*G06N 5/04* (2006.01)
*G06N 99/00* (2019.01)
(Continued)

(52) U.S. Cl.
CPC ........... *G06N 5/043* (2013.01); *G06F 18/214* (2023.01); *G06N 20/00* (2019.01); *H04L 9/0637* (2013.01); *H04L 9/50* (2022.05)

(58) Field of Classification Search
CPC ........ G06N 5/043; G06N 20/00; G06N 20/20; G06K 9/6256; H04L 9/0637; H04L 2209/38; H04L 9/3239; H04L 63/12
(Continued)

(56) References Cited

U.S. PATENT DOCUMENTS 9,413,779 B2  8/2016  Vasseur et al.
9,569,517 B1  2/2017  Smola et al.
(Continued)

FOREIGN PATENT DOCUMENTS

AU  2017100968 A4  9/2017
CN  105488675 A  4/2016
(Continued)

OTHER PUBLICATIONS

Abebe Abeshu Diro et al., Deep Learning: The Frontier for Distributed Attack Detention in Fog-to-Things Computing, Feb. 2018, IEEE Communications Magazine, pp. 169-175. (Year: 2018).*
(Continued)

*Primary Examiner* — Scott C Anderson
*Assistant Examiner* — George N. Proios
(74) *Attorney, Agent, or Firm* — Sheppard Mullin Richter & Hampton LLP

(57) ABSTRACT

Decentralized machine learning to build models is performed at nodes where local training datasets are generated. A blockchain platform may be used to coordinate decentralized machine learning over a series of iterations. For each iteration, a distributed ledger may be used to coordinate the nodes. Rules in the form of smart contracts may enforce node participation in an iteration of model building and parameter sharing, as well as provide logic for electing a node that serves as a master node for the iteration. The master node obtains model parameters from the nodes and generates final parameters based on the obtained parameters. The master node may write its state to the distributed ledger indicating that the final parameters are available. Each node, via its copy of the distributed ledger, may discover the master node's state and obtain and apply the final parameters to its local model, thereby learning from other nodes.

20 Claims, 7 Drawing Sheets

(51) Int. Cl.
- *G06K 9/62* (2022.01)
- *H04L 9/06* (2006.01)
- *G06N 5/043* (2023.01)
- *G06N 20/00* (2019.01)
- *G06F 18/214* (2023.01)
- *H04L 9/00* (2022.01)

(58) Field of Classification Search
USPC .......................................................... 706/12
See application file for complete search history.

(56) References Cited

U.S. PATENT DOCUMENTS

| | | | |
|---|---|---|---|
| 9,633,315 B2* | 4/2017 | Chapelle et al. | G06N 99/00 |
| 9,779,557 B2 | 10/2017 | Hauser et al. | |
| 9,875,510 B1 | 1/2018 | Kasper | |
| 10,057,243 B1 | 8/2018 | Kumar et al. | |
| 10,360,500 B2 | 7/2019 | Kabul et al. | |
| 10,547,679 B1 | 1/2020 | Burnett et al. | |
| 10,671,435 B1 | 6/2020 | Gold et al. | |
| 11,334,817 B2 | 5/2022 | Wang et al. | |
| 2012/0039473 A1 | 2/2012 | Gentry et al. | |
| 2013/0290223 A1 | 10/2013 | Chapelle et al. | |
| 2015/0324690 A1 | 11/2015 | Chilimbi et al. | |
| 2015/0332283 A1* | 11/2015 | Witchey | G06Q 30/00 |
| 2016/0087854 A1 | 3/2016 | Jayanti et al. | |
| 2016/0217388 A1 | 7/2016 | Okanohara et al. | |
| 2016/0261690 A1 | 9/2016 | Ford | |
| 2016/0335533 A1 | 11/2016 | Davis et al. | |
| 2017/0060988 A1 | 3/2017 | Kudo et al. | |
| 2017/0091397 A1 | 3/2017 | Shah | |
| 2017/0103468 A1 | 4/2017 | Orsini et al. | |
| 2017/0116693 A1 | 4/2017 | Rae et al. | |
| 2017/0134158 A1 | 5/2017 | Pasol et al. | |
| 2017/0140145 A1 | 5/2017 | Shah | |
| 2017/0169358 A1 | 6/2017 | Choi et al. | |
| 2017/0220949 A1 | 8/2017 | Feng et al. | |
| 2017/0272342 A1 | 9/2017 | Zessin et al. | |
| 2017/0279774 A1 | 9/2017 | Booz et al. | |
| 2017/0289111 A1 | 10/2017 | Voell et al. | |
| 2017/0302663 A1 | 10/2017 | Nainar et al. | |
| 2018/0018590 A1* | 1/2018 | Szeto et al. | G06N 99/00 |
| 2018/0039667 A1 | 2/2018 | Pierce et al. | |
| 2018/0157688 A1 | 6/2018 | Zessin et al. | |
| 2018/0183768 A1 | 6/2018 | Lobban et al. | |
| 2018/0217905 A1 | 8/2018 | Reza et al. | |
| 2018/0247191 A1 | 8/2018 | Katz et al. | |
| 2018/0331897 A1 | 11/2018 | Zhang et al. | |
| 2019/0020629 A1 | 1/2019 | Baird et al. | |
| 2019/0042407 A1 | 2/2019 | Gao et al. | |
| 2019/0089716 A1 | 3/2019 | Stocker | |
| 2019/0138929 A1* | 5/2019 | Wong et al. | G06N 20/20 |
| 2019/0147532 A1* | 5/2019 | Singh et al. | G06Q 40/04 |
| 2019/0182030 A1 | 6/2019 | Jo | |
| 2019/0182231 A1 | 6/2019 | Harrer et al. | |
| 2019/0287026 A1* | 9/2019 | Calmon et al. | G06N 99/00 |
| 2019/0295000 A1 | 9/2019 | Candel et al. | |
| 2019/0317934 A1 | 10/2019 | Jentzsch et al. | |
| 2019/0325432 A1 | 10/2019 | Ow et al. | |
| 2019/0332921 A1* | 10/2019 | Rodriguez | G06N 3/04 |
| 2019/0332966 A1 | 10/2019 | Gidney | |
| 2019/0347540 A1 | 11/2019 | Yim et al. | |
| 2020/0042362 A1 | 2/2020 | Cui et al. | |
| 2020/0057920 A1 | 2/2020 | Collins et al. | |
| 2020/0193292 A1 | 6/2020 | Weng et al. | |
| 2020/0218940 A1 | 7/2020 | Anglin et al. | |
| 2020/0244435 A1 | 7/2020 | Shpurov et al. | |
| 2020/0348662 A1 | 11/2020 | Cella et al. | |
| 2021/0134095 A1 | 5/2021 | Milt et al. | |

FOREIGN PATENT DOCUMENTS

| | | |
|---|---|---|
| CN | 106228446 A | 12/2016 |
| CN | 106445711 A | 2/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107665154 A | 2/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110490330 A | 11/2019 |
| EP | 3564873 A1 | 11/2019 |
| WO | 2017/203093 A1 | 11/2017 |
| WO | 2018/059939 A1 | 4/2018 |
| WO | 2018/130267 A1 | 7/2018 |
| WO | 2018/191030 A1 | 10/2018 |

OTHER PUBLICATIONS

Xuhui Chen, et al., When Machine Learning Meets Blockchain: A Decentralized, Privacy-preserving and Secure Design, 2018 IEEE International Conference on Big Data, pp. 1178-1187. (Year: 2018).*
Decentralized Machine Learning White Paper, Dec. 31, 2017, www.decentralizedml.com . (Year: 2017).*
Angelia Nedic, et al., Network Topology and Communication-Computation Tradeoffs in Decentralized Optimization, Jan. 15, 2018, arXiv:1709.08765 [math.OC], pp. 1-32. (Year: 2018).*
Bank for International Settlements, "Distributed ledger technology in payment, clearing and settlement", Committee on Payments and Market Infrastructures, Feb. 2017, 29 pages.
Catherine Sturman, "OWKIN is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.
Extended European Search Report received for EP Patent Application No. 18177565.1, dated Nov. 30, 2018, 08 pages.
Extended European Search Report received for EP Patent Application No. 18177566.9, dated Dec. 13, 2018, 07 pages.
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.
Li et al., "Scaling Distributed Machine Learning with the Parameter Server", 11th USENIX Symposium on Operating Systems Design and Implementation, Oct. 6-8, 2014, 17 pages.
Mendis et al., "Blockchain as a Service: An Autonomous, Privacy Preserving, Decentralized Architecture for Deep Learning", Research Paper, Jul. 5, 2018, pp. 1-8.
Nakamoto et al., "Bitcoin: A Peer-to-Peer Electronic Cash System", Oct. 31, 2008, pp. 1-9.
Pop at al., "Blockchain Based Decentralized Management of Demand Response Programs in Smart Energy Grids", MDPI, Jan. 9, 2018, pp. 1-21.
Venkataraman et al., "Adopting blockchain for enterprise asset management (EAM)", IBM, available online at <https://developer.ibm.com/technologies/blockchain/tutorials/cl-adopting-blockchain-for-enterprise-asset-management-eam/>, Mar. 17, 2017, 15 pages.
Weng et al., "DeepChain: Auditable and Privacy-Preserving Deep Learning with Blockchain-based Incentive", Journal of Latex Class Files, vol. 14(8), Nov. 2019, pp. 1-18.
Zhang et al., "Stay Fresh: Speculative Synchronization for Fast Distributed Machine Learning", 2018 IEEE 38th International Conference on Distributed Computing Systems (ICDCS), 2018, 11 pages.
Abadi et al., "TensorFlow: A System for Large-Scale Machine Learning", 2th USENIX Symposium on Operating Systems Design and Implementation (OSDI '16), Nov. 2-4, 2016, 21 pages.
Ali et al., "Applications of Blockchains in the Internet of Things: A Comprehensive Survey", IEEE Communications Surveys & Tutorials, 2018, 42 pages.

(56) References Cited

OTHER PUBLICATIONS

Chen et al., "When Machine Learning Meets Blockchain: A Decentralized, Privacy-preserving and Secure Design", IEEE International Conference on Big Data (Big Data), 2018, pp. 1178-1187.
Kim et al., "On-Device Federated Learning via Blockchain and its Latency Analysis", Research Gate, Aug. 2018, 4 pages.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, dated Jun. 2, 2020, 15 pages.
Singla et al.., "Machine Learning for Secure Device Personalization Using Blockchain", IEEE, Sep. 19, 2018, 7 pages.
Verbraeken et al., A Survey on Distributed Machine Learning, (Research Paper), ACM Computing Surveys, vol. 53, No. 2, Mar. 2020, pp. 1-33.
The Case for Decentralized Artificial Intelligence, (Web Page), Retrieved Mar. 8, 2018, 7 Pgs.
The Convergence of Ai and Iot, Are We There Yet?, (Web Page), Retrieved Mar. 8, 2018, 11 Pgs.
Search Report and Written Opinion received for PCT Application No. PCT/US2021/014932, dated May 13, 2021, 08 pages.
Keith Bonawitz et al: "Practical Secure Aggregation for Privacy Preserving Machine Learning", International Association for Cryptologic Research,, vol. 20170405:163240, Apr. 5, 2017 (Apr. 5, 2017), pp. 1-20.
Jing Chen et al: "Algorand", May 26, 2017 (May 26, 2017), pp. 1-75, XP55547278, Retrieved from the Internet: URL: https://arxiv.org/pdf/1607.01341.pdf [retrieved on Jan. 24, 2019].
Georgopoulos Leonidas et al: "Di stributed machine learning in networks by consensus", Neurocomputing, vol. 124, Apr. 8, 2013 (Apr. 8, 2013), pp. 2-12, XP828756393, ISSN: 0925-2312, DOI: 18.1816/J.NEUCOM. 2012. 12. 055.
A Besir Kurtulmus et al: "Trustless Machine Learning Contracts; Evaluating and Exchanging Machine Learning Models on the Ethereum Blockchain", CORR (ARXIV), Feb. 27, 2018 (Feb. 27, 2018), pp. 1-11.
Search Report and Written Opinion received for PCT Application No. PCT/US2021/013394, dated Apr. 19, 2021, 08 pages.
Yuguang et al., "Review and Research for Consensus Mechanism of Block Chain", China Academic Journal Electronic Publishing House, Research Papers, vol. 4, No. 4, Apr. 2018, pp. 369-379. (English Abstract Only).
Kate et al, "Distributed Key Generation in the Wild", Report 2012/377, 2012, pp. 1-30.
Acar et al. , "A Survey on Homomorphic Encryption Schemes: Theory and Implementation", ACM Computing Surveys, vol. 51, No. 4, Article 79, Jul. 2018, pp. 79:1-79:35.
Bonawitz et al., "Practical Secure Aggregation for Privacy-Preserving Machine Learning", Cryptology ePrint Archive: Report 2017/281, 2017, 21 pages.
Cheung, et, al., "Distributed Machine learning white paper," 2017. (Year 2017).
Kate, Aniket et al. "Distributed Key Generation in the Wild." IACR Cryptol. ePrint Arch. 2012 (2012): 377. (Year: 2012).
Kurakin et al., "Adversarial Examples in the Physical World", CoRR, abs/1607.02533, 2017, pp. 1-14.
M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).
Shokri et al., "Membership Inference Attacks Against Machine Learning Models", CoRR, abs/1610.05820, 2017, 16 pages.
Yuan et al., "Privacy Preserving Back-Propagation Neural Network Learning Made Practical with Cloud Computing", IEEE Transactions on Parallel and Distributed Systems, 2013, vol. 25, pp. 1-11.
European Search Report and Search Opinion received for EP Application No. 21747157.2, dated Oct. 28, 2022, 5 pages.
Li et al., "DLBC: A Deep Learning-Based Consensus in Blockchains for Deep Learning Services", IEEE Transactions On Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMoN: A Decentralized Artificial Intelligence Model Network", Jul. 2019, 8 pages.
Reisizadeh et al., "Robust and Communication-Efficient Collaborative Learning", Oct. 31, 2019, 33 pages.
Watanabe et al., "Blockchain contract: A complete consensus using blockchain," 2015 IEEE 4th Global Conference on Consumer Electronics (GCCE), 2015, pp. 577-578, doi: 10.1109/GCCE.2015. 7398721. (Year: 2015).
Yang et al. "Federated Machine Learning: Concept and Applications" arXiv preprint arXiv: 1902.04885 (2019). (Year 2019).

\* cited by examiner

SYSTEM AND METHOD OF DECENTRALIZED MACHINE LEARNING USING BLOCKCHAIN

CROSS-REFERENCE TO RELATED APPLICATIONS

The present application claims priority to Indian Patent Application No. 201841016309, filed on Apr. 30, 2018, which is incorporated herein by reference in its entirety.

BACKGROUND OF THE INVENTION

Efficient model building requires large volumes of data. While distributed computing has been developed to coordinate large computing tasks using a plurality of computers, applications to large scale machine learning ("ML") problems is difficult. There are several practical problems that arise in distributed model building such as coordination and deployment difficulties, security concerns, effects of system latency, fault tolerance, parameter size and others. While these and other problems may be handled within a single data center environment in which computers can be tightly controlled, moving model building outside of the data center into truly decentralized environments creates these and additional challenges, especially while operating in open networks. For example, in distributed computing environments, the accessibility of large and sometimes private training datasets across the distributed devices can be prohibitive and changes in topology and scale of the network over time makes coordination and real-time scaling difficult.

SUMMARY

According to various embodiments of the disclosed technology, decentralized machine learning via a plurality of iterations of training may be coordinated and facilitated using a distributed ledger of a blockchain network having a number of physical computing nodes. Each of the nodes may enroll with the blockchain network to participate in a first iteration of training a machine-learned model at a first time. Each node may participate in a consensus decision to enroll another physical computing node to participate in the first iteration. The consensus decision applies only to the first iteration and may not register the second physical computing node to participate in subsequent iterations.

Upon registration of a specified number of nodes required for an iteration of training, each node may obtain a local training dataset accessible locally but not accessible at other ones of the physical computing nodes in the blockchain network. Each participant node may train a first local model based on the local training dataset during the first iteration, and obtain at least a first training parameter based on the first local model. In this manner, each participant node may train on data that is locally accessible but should not or cannot be shared with other nodes. Each participant node may generate a blockchain transaction comprising an indication that the participant node is ready to share the first training parameter, and may transmit or otherwise provide the first training parameter to a master node.

The master node may generate a new transaction to be added as a ledger block to each copy of the distributed ledger based on the indication that the first physical computing node is ready to share the first training parameter. The master node may be elected from among the participant nodes by consensus decision or may simply be selected based on being the first node to enroll in the iteration. The master node may obtain the training parameters from each of the participant nodes, and create final training parameters based on the obtained training parameters. Upon generation of the final training parameters, the master node may broadcast an indication to the blockchain network that the final training parameters are available and may relinquish status as a master node for the current iteration.

Each participant node may obtain, from the blockchain network, one or more final training parameters that were generated by the master node based on the first training parameter and at least a second training parameter generated at, and shared from, the second physical computing node. Each participant node may then apply the one or more final training parameters to the first local model. It should be noted that even nodes that did not participate in the current iteration may consult the distributed ledger to synchronize to the latest set of training parameters. In this manner, decentralized machine learning may be dynamically scaled as the availability of nodes changes, while providing updated training parameters learned through decentralized machine learning to nodes as they become available or join the network.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1:
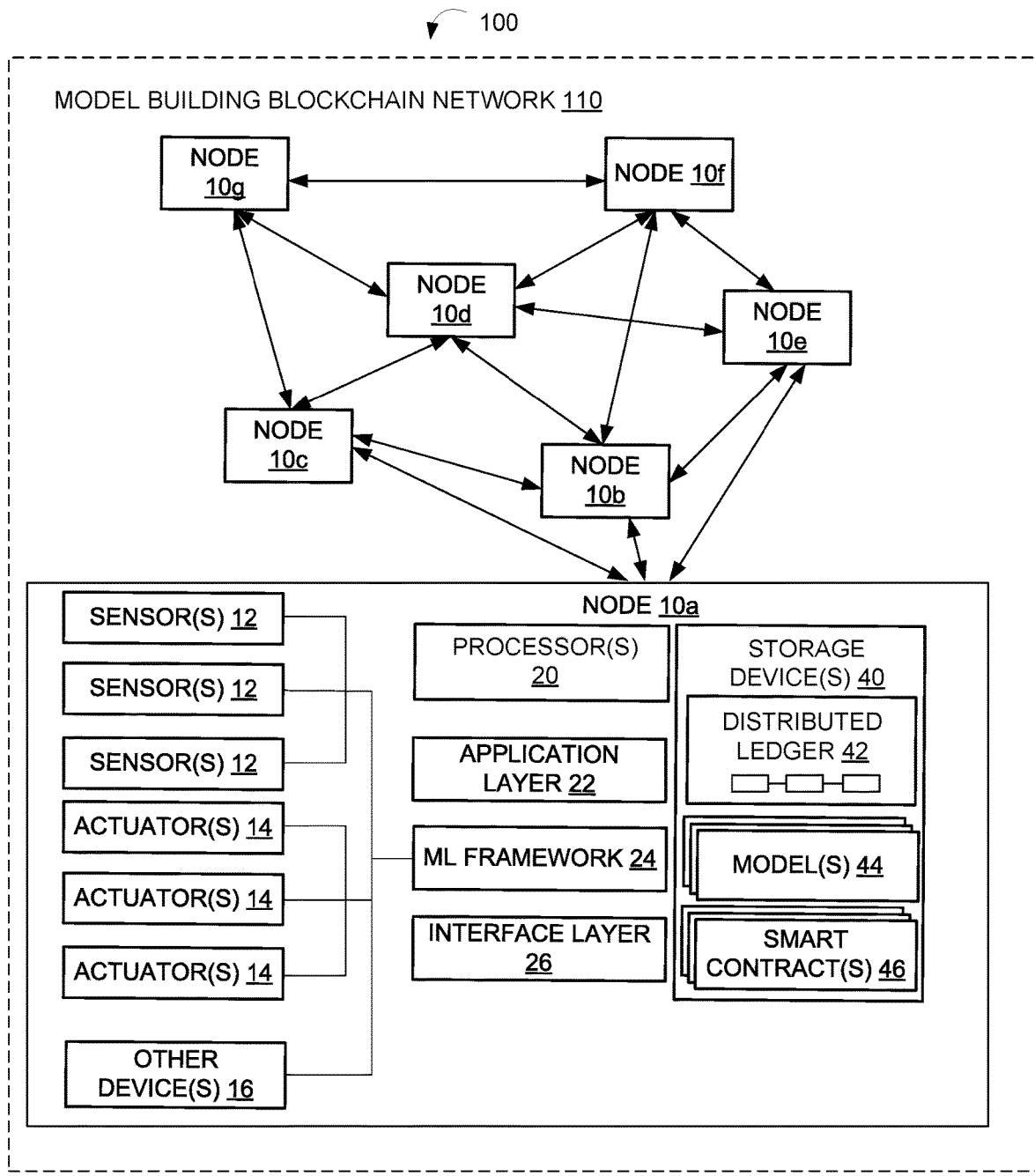
FIG. 1 illustrates an example of a system of decentralized model building in machine learning using blockchain, according to an example implementation of the invention.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE INVENTION

The disclosure relates to decentralized parallel machine learning at nodes over multiple iterations in a blockchain network. Generally, a blockchain network can refer to a network where nodes use, e.g., a consensus mechanism to update a blockchain that is distributed across multiple parties. Computing power at edge devices that can serve as nodes may be leveraged to perform model training. These nodes can be referred to as "edge" systems as they may be placed at or near the boundary of an IT infrastructure where the real world interacts with large information technology infrastructure. For example, autonomous ground vehicles currently include more than one computing device that can communicate with fixed server assets. More broadly, edge devices such as "Internet of Things" (or "IoT") devices in various context such as consumer electronics, appliances, drones, and others are increasingly equipped with computational and network capacity. Another example includes real-time traffic management in smart cities, which divert their data to a data center. However, as described herein these edge devices may be decentralized for efficiency and scale to perform parallel machine learning as nodes in a blockchain network.

Using the disclosure herein, model building may be pushed to these and other nodes, addressing changes to input data patterns, scaling the system, and coordinating the model building activities across the nodes. Moving the model building closer to where the data is generated or otherwise is accessible opens up new opportunities to perform efficient real time analysis of data at the location where the data is generated, instead of having to consolidate the data at datacenters and the associated problems of doing so. Without the need to consolidate all input data into one physical location (data center or "core" of the IT infrastructure), the disclosed systems, methods, and non-transitory machine-readable storage media may reduce the time (e.g., model training time) for the model to adapt to changes in environmental conditions and make more accurate predictions. Thus, applications of the system may become truly autonomous and decentralized, whether in an autonomous vehicle context and implementation or other IoT or network-connected contexts.

The nodes in the blockchain network may enroll to participate in an iteration of model training. Not all nodes necessarily enroll to participate in a given iteration, but all nodes may obtain updated training parameters from the iteration. Nodes enrolled to participate in an iteration of model training may collectively generate a consensus decision on whether to enroll a node based on a requesting node's state and/or credentials.

Each node enrolled to participate in an iteration (also referred to herein as a "participant node") may train a local model using training data that is accessible locally at the node, but may not be accessible at other nodes. For example, the training data may include sensitive or otherwise private information that should not be shared with other nodes, but training parameters learned from such data through machine learning can be shared. When training parameters are obtained at a node, the node may broadcast an indication that it is ready to share the training parameters. The node may do so by generating a blockchain transaction that includes the indication and information indicating where the training parameters may be obtained (such as a Uniform Resource Indicator address). When some or all of the participant nodes are ready to share its respective training parameters, a master node (also referred to as "master computing node") may write the indications to a distributed ledger. The minimum number of participants nodes that are ready to share training parameters in order for the master node to write the indications may be defined by one or more rules, which may be encoded in a smart contract, as described herein.

For example, the first node to enroll in the iteration may be selected to serve as the master node or the master node may be elected by consensus decision. The master node may obtain the training parameters from each of the participating nodes and then merge them to generate a set of merged training parameters. Merging the training parameters can be accomplished in a variety of ways, e.g., by consensus, by majority decision, averaging, and/or other mechanism(s) or algorithms. For example, Gaussian merging-splitting can be performed. As another example, cross-validation across larger/smaller groups of training parameters can be performed vis-à-vis radial basis function kernel, where the kernel can be a measure of similarity between training parameters. The master node may broadcast an indication that it has completed generating the merged training parameters, such as by writing a blockchain transaction that indicates the state change. Such state change (in the form of a transaction) may be recorded as a block to the distributed ledger with such indication. The nodes may periodically monitor the distributed ledger to determine whether the master node has completed the merge, and if so, obtain the merged training parameters. Each of the nodes may then apply the merged training parameters to its local model and then update its state, which is written to the distributed ledger.

By indicating that it has completed the merge, the master node also releases its status as master node for the iteration. In the next iteration a new master node will likely, though not necessarily, be selected. Training may iterate until the training parameters converge. Training iterations may be restarted once the training parameters no longer converge, thereby continuously improving the model as needed through the blockchain network.

Because decentralized machine learning as described herein occurs over a plurality of iterations and different sets of nodes may enroll to participate in any one or more iterations, decentralized model building activity can dynamically scaled as the availability of nodes changes. For instance, even as autonomous vehicle computers go online (such as being in operation) or offline (such as having vehicle engine ignitions turned off), the system may continuously execute iterations of machine learning at available nodes. Using a distributed ledger, as vehicles come online, they may receive an updated version of the distributed ledger, such as from peer vehicles, and obtain the latest parameters that were learned when the vehicle was offline.

Furthermore, dynamic scaling does not cause degradation of model accuracy. By using a distributed ledger to coordinate activity and smart contracts to enforce synchronization by not permitting stale or otherwise uninitialized nodes from participating in an iteration, the stale gradients problem can be avoided. Use of the decentralized ledger and smart contracts may also make the system fault-tolerant. Node restarts and other downtimes can be handled seamlessly without loss of model accuracy by dynamically scaling participant nodes and synchronizing learned parameters.

Furthermore, building applications that implement the ML models for experimentation can be simplified because a decentralized application can be agnostic to network topology and role of a node in the system.

FIG. 1 illustrates an example of a system 100 of decentralized model building in machine learning using blockchain, according to an implementation of the invention. System 100 may include a model building blockchain network 110 (also referred to as a blockchain network 110) that includes a plurality of physical computing nodes 10 (also referred to collectively as nodes 10 or individually as nodes 10a-10g). The particular number, configuration and connections between nodes 10 may vary. As such, the arrangement of nodes 10 shown in FIG. 1 is for illustrative purposes only. A node, such as node 10a may be a fixed or mobile device. Examples of further details of a node 10 will now be described. While only one of the nodes 10 is illustrated in detail in the figures, each of the nodes 10 may be configured in the manner illustrated.

Node 10a may include one or more sensors 12, one or more actuators 14, other devices 16, one or more processors 20 (also interchangeably referred to herein as processors 20, processor(s) 20, or processor 20 for convenience), one or more storage devices 40, and/or other components. The sensors 12, actuators 14, and/or other devices 16 may generate data that is accessible locally to the node 10. Such data may not be accessible to other participant nodes 10 in the model building blockchain network 110.

It should be noted that storage device(s) 40 may store distributed ledger 42, model(s) 44, and smart contract(s) 46. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of a node 10a relating to its machine learning during an iteration. Thus, the distributed ledger 42 may store an immutable record of the state transitions of a node 10. In this manner, the distributed ledger 42 may store a current and historic state of a model 44. It should be noted, however, that in some embodiments, some collection of records, models, and smart contracts from one or more of other nodes (e.g., node(s) 10b-10g) may be stored in distributed ledger 42.

Model 44 may be locally trained at a node 10 based on locally accessible data, as described herein, and then updated based on model parameters learned at other participant nodes 10. As noted elsewhere herein, the nature of the model 44 will be based on the particular implementation of the node 10 itself. For instance, model 44 may include trained parameters relating: to self-driving vehicle features such as sensor information as it relates object detection, dryer appliance relating to drying times and controls, network configuration features for network configurations, security features relating to network security such as intrusion detection, and/or other context-based models.

The smart contracts 46 may include rules that configure nodes to behave in certain ways in relation to decentralized machine learning. For example, the rules may specify deterministic state transitions, when and how to elect a master node, when to initiate an iteration of machine learning, whether to permit a node to enroll in an iteration, a number of nodes required to agree to a consensus decision, a percentage of voting nodes required to agree to a consensus decision, and/or other actions that a node 10 may take for decentralized machine learning.

The processors 20 may obtain other data accessible locally to node 10 but not necessarily accessible to other participant nodes 10 as well. Such locally accessible data may include, for example, private data that should not be shared with other devices but model parameters that are learned from the private data can be shared.

Processors 20 may be programmed by one or more computer program instructions. For example, processors 20 may be programmed to execute an application layer 22, a machine learning framework 24 (illustrated and also referred to as ML framework 24), an interface layer 26, and/or other instructions to perform various operations, each of which are described in greater detail herein. As used herein, for convenience, the various instructions will be described as performing an operation, when, in fact, the various instructions program the processors 20 (and therefore node 10) to perform the operation.

The application layer 22 may execute applications on the node 10. For instance, the application layer 22 may include a blockchain agent (not illustrated) that programs the node 10 to participate and/or serve as a master node in decentralized machine learning across the blockchain network 110 as described herein. Each node 10 may be programmed with the same blockchain agent, thereby ensuring that each acts according to the same set of decentralized model building rules, such as those encoded using smart contracts 46. For example, the blockchain agent may program each node 10 to act as a participant node as well as a master node (if elected to serve that roll). The application layer 22 may execute machine learning through the ML framework 24.

The ML framework 24 may train a model based on data accessible locally at a node 10. For example, the ML framework 24 may generate model parameters from data from the sensors 12, the actuators 14, and/or other devices or data sources to which the node 10 has access. In an implementation, the ML framework 24 may use the TensorFlown™ machine learning framework, although other frameworks may be used as well. In some of these implementations, a third party framework Application Programming Interface ("API") may be used to access certain model building functions provided by the machine learning framework. For example, a node 10 may execute API calls to TensorFlown™ or other machine learning framework.

The application layer 22 may use the interface layer 26 to interact with and participate in the blockchain network 110 for decentralized machine learning across multiple participant nodes 10. The interface layer 26 may communicate with other nodes using blockchain by, for example, broadcasting blockchain transactions and, for a master node elected as describe herein elsewhere, writing blocks to the distributed ledger 42 based on those transactions as well as based on the activities of the master node.

Figure 2:
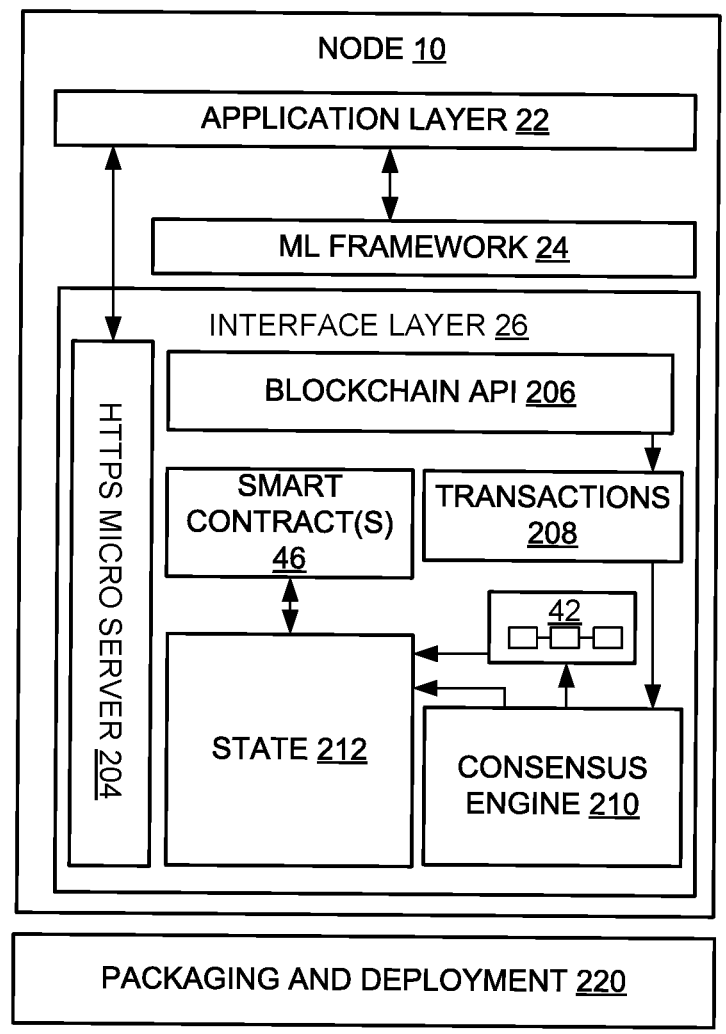
FIG. 2 illustrates an example of a node in a blockchain network for decentralized model building in machine learning using blockchain, according to an example implementation of the invention.

Referring now to FIG. 2, which illustrates an example of a node 10 in a blockchain network for decentralized model building in machine learning using blockchain, the application layer 22 may include a blockchain agent that initiates model training. The application layer 22 may use the distributed ledger 42 to coordinate parallel model building during an iteration with other participant nodes 10 in accordance with the smart contracts 46.

The interface layer 26 may include a messaging interface used to communicate via a network with other participant nodes 10. The messaging interface may be configured as a Secure Hypertext Transmission Protocol ("HTTPS") microserver 204. Other types of messaging interfaces may be used as well. The interface layer 26 may use a blockchain API 206 to make API calls for blockchain functions based on a blockchain specification. Examples of blockchain functions include, but are not limited to, reading and writing blockchain transactions 208 and reading and writing blockchain blocks to the distributed ledger 42. One example of a blockchain specification is the Ethereum specification. Other blockchain specifications may be used as well.

Consensus engine 210 may include functions that facilitate the writing of data to the distributed ledger 42. For example, in some instances, a master node (e.g., one of the participant nodes 10) may use the consensus engine 210 to decide when to merge local parameters from nodes 10, write an indication that its state 212 has changed as a result of merging local parameters to the distributed ledger 42, and/or to perform other actions. In some instances, any participant node 10 (whether a master node or not), may use the consensus engine 210 to perform consensus decisioning such as whether to enroll a node to participate in an iteration of machine learning. In this way, a consensus regarding certain decisions can be reached after data is written to distributed ledger 42.

In some implementations, packaging and deployment 220 may package and deploy a model 44 as a containerized object. For example and without limitation, packaging and deployment 220 may use the Docker platform to generate Docker files that include the model 44. Other containerization platforms may be used as well. In this manner various applications at node 10 may access and use the model 44 in a platform-independent manner. As such, the models may not only be built based on collective parameters from nodes in a blockchain network, but also be packaged and deployed in diverse environments.

Reference will now be made with respect to FIG. 2 which illustrates a schematic diagram of a node participating in an iteration of machine learning using blockchain. Each node 10 (including node 10 elected as a master node) may be configured in more detail as illustrated in FIGS. 1 and 2.

Each iteration of model building (also referred to herein as machine learning or model training) may include multiple phases, such as a first and second phases. In the first phase, each participant node 10 trains its local models independently of other participant nodes 10 using its local training dataset, which may be accessible locally to the participant node but not to other nodes. As such, each participant node 10 may generate model parameters resulting from the local training dataset. In the second phase, the participant nodes 10 may each share the model parameters with the blockchain network 110. For example, each participant node 10 may share its model parameter to a master node, which is elected from among the nodes in the blockchain network 110. The master node may combine the parameters from the participant nodes 10 to generate a final parameter for the current iteration. The final parameter may be distributed to the participant nodes 10, which each update their local state.

Figure 3:
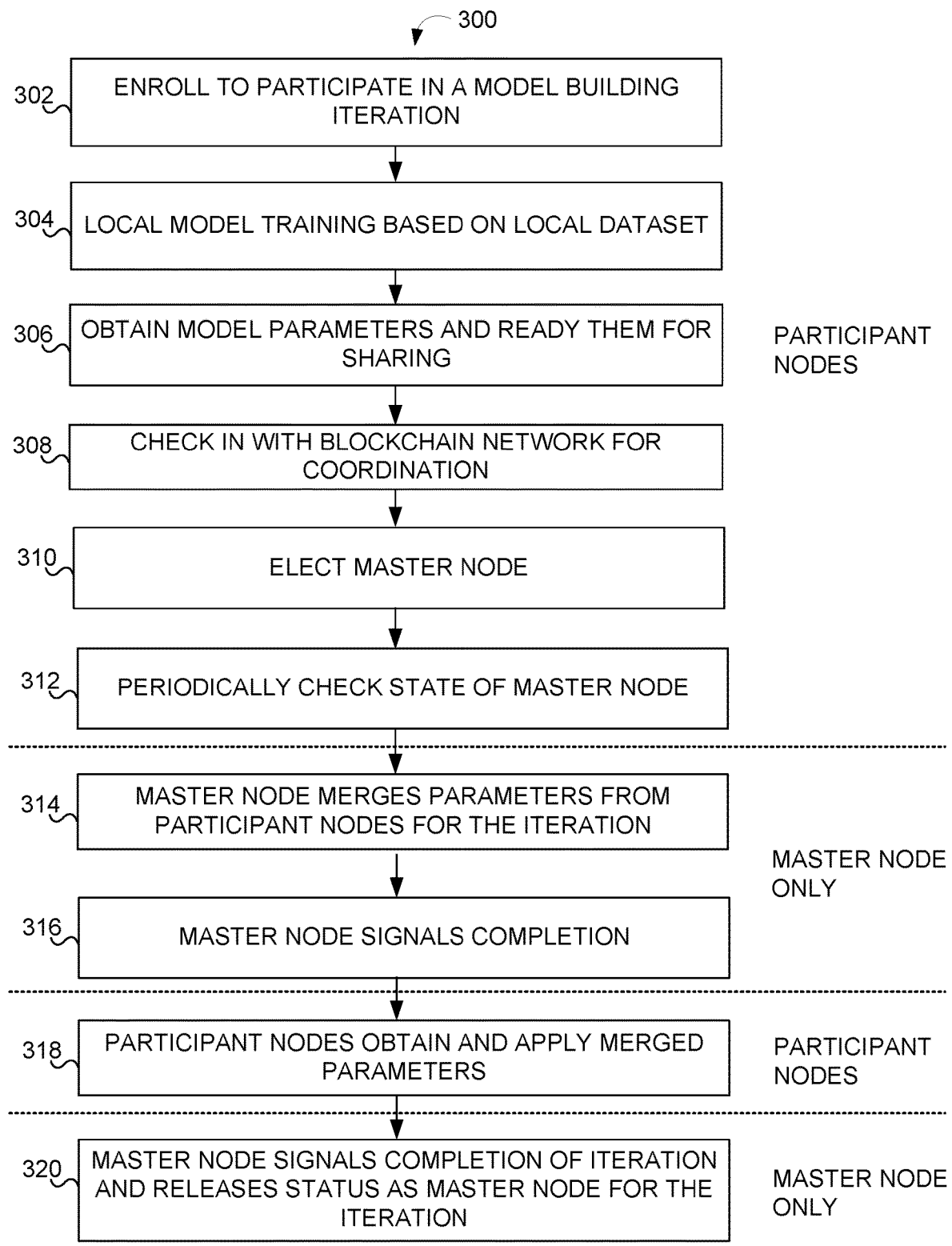
FIG. 3 illustrates an example of a process of an iteration of model building using blockchain, according to an example implementation of the invention.

Further details of an iteration of model-building are now described with reference to FIG. 3, which illustrates an example of a process 300 of an iteration of model building using blockchain according to one embodiment of the systems and methods described herein. As illustrated in FIG. 3, operations 302-312 and 318 are applicable to participant nodes, whereas operations 314, 316, and 320 are applicable to master node.

In an operation 302, each participant node 10 may enroll to participate in an iteration of model building. In an implementation, the smart contracts 46 may encode rules for enrolling a node 10 for participation in an iteration of model building. The rules may specify required credentials, valid state information, and/or other enrollment prerequisites. The required credentials may impose permissions on which nodes 10 are allowed to participate in an iteration of model building. In these examples, the blockchain network 110 may be configured as a private blockchain where only authorized nodes are permitted to participate in an iteration.

The authorization information and expected credentials may be encoded within the smart contracts 46 or other stored information available to nodes on the blockchain network 110. The valid state information may prohibit nodes exhibiting certain restricted semantic states from participating in an iteration. The restricted semantic states may include, for example, having uninitialized parameter values, being a new node requesting enrollment in an iteration after the iteration has started (with other participant nodes 10 in the blockchain network 110), a stale node or restarting node, and/or other states that would taint or otherwise disrupt an iteration of model building. Stale or restarting nodes may be placed on hold for an iteration so that they can synchronize their local parameters to the latest values, such as after the iteration has completed.

Once a participant node 10 has been enrolled, the blockchain network 110 may record an identity of the participant node 10 so that an identification of all participant nodes 10 for an iteration is known. Such recordation may be made via an entry in the distributed ledger 42. The identity of the participant nodes 10 may be used by the consensus engine 210 when making strategic decisions.

The foregoing enrollment features may make model building activity fault tolerant because the topology of the model building network (i.e., the blockchain network 110) is decided at the iteration level. This permits deployment in real world environments like autonomous vehicles where the shape and size of the network can vary dynamically.

In an operation 304, each of the participant nodes may execute local model training on its local training dataset. For example, the application layer 22 may interface with the machine learning framework 24 to locally train a model on its local training dataset, which may be source locally or is otherwise accessible at a participant node 10 but not at other participant nodes 10.

In an operation 306, each of the participant nodes 10 may generate local parameters based on the local training and may keep them ready for sharing with the blockchain network 110. For example, after the local training cycle is complete, the local parameters may be serialized into compact packages that can be shared with rest of the blockchain network. Such sharing may be facilitated through making the local parameters available for download and/or actively uploading them through peer-to-peer or other data transmission protocols.

In an operation 308, each participant node 10 may check in with the blockchain network 110 for co-ordination. For instance, each participant node 10 may signal the other participant nodes 10 in the blockchain network that it is ready for sharing its local parameters. In particular, each participant node 10 may write a blockchain transaction (using, for example, the blockchain API 206 and broadcast the blockchain transaction via the messaging interface and the blockchain API 206. Such blockchain transaction may indicate the participant node's state (e.g., that it is ready to share its local parameters), a mechanism for obtaining the local parameters, a location at which to obtain the local parameters, and/or other information that conveys the readiness of a node for sharing or identification of how to obtain the local parameters from other participant nodes. The transactions may be queued in a transaction queue or pool from which transactions are selected. These transactions may be timestamped and selected from, in some examples, in a first-in-first-out ("FIFO") manner.

In an operation 310, participant nodes may collectively elect a master node for the iteration. For example, the smart contracts 46 may encode rules for electing the master node. Such rules may dictate how a participant node 10 should vote on electing a master node (for implementations in which nodes vote to elect a master node). These rules may specify that a certain number and/or percentage of participant nodes 10 should be ready to share its local parameters before a master node should be elected, thereby initiating the sharing phase of the iteration. It should be noted, however, that election of a master node may occur before participant nodes 10 are ready to share local parameters. For example, a first node to enroll in an iteration may be selected as the master node. As such, election (or selection) of a master node per se may not trigger transition to the sharing phase. Rather, the rules of smart contracts 46 may specify when the second phase should be initiated, thereby ensuring this transition occurs in a deterministic manner.

The master node may be elected in various ways other than or in addition to the first node to enroll. For example, a particular node may be predefined as being a master node. When an iteration is initiated, the particular node may become the master node. In some of these instances, one or more backup nodes may be predefined to serve as a master node in case the particular node is unavailable for a given iteration. In other examples, a node may declare that it should not be the master node. This may be advantageous in heterogeneous computational environments in which nodes have different computational capabilities. One example is in a drone network in which a drone may declare it should be not the master node and a command center may be declared as the master node. In yet other examples, a voting mechanism may be used to elect the master node. Such voting may be governed by rules encoded in a smart contract. This may be advantageous in homogeneous computational environments in which nodes have similar computational capabilities such as in a network of autonomous vehicles. Other ways to elect a master node may be used according to particular needs and based on the disclosure herein.

In an operation 312, participant nodes 10 that are not a master node may periodically check the state of the master node to monitor whether the master node has completed generation of parameters based on local parameters shared by participant nodes. For example, each participant node may inspect its local copy of the distributed ledger 42, within which the master node will record its state for the iteration on one or more blocks.

In an operation 314, the master node may enter a sharing phase in which some or all participant nodes are ready to share their local parameters. For instance, the master node may obtain local parameters from nodes 10 whose state indicated that they are ready for sharing. Using the blockchain API 206, the master node may identify transactions that both: (1) indicate that a participant node 10 is ready to share its local parameters and (2) are not signaled in the distributed ledger 42. In some instances, transactions in the transaction queue have not yet been written to the distributed ledger 42. Once written to the ledger, the master node (through the blockchain API 206) may remove the transaction from or otherwise mark the transaction as confirmed in the transaction queue. The master node may identify corresponding participant nodes 10 that submitted them, and obtain the local parameters (the location of which may be encoded in the transaction). The master node may combine the local parameters from the participant nodes 10 to generate final parameters for the iteration based on the combined local parameters. It should be noted that the master node may have itself generated local parameters from its local training dataset, in which case it may combine its local parameters with the obtained local parameters as well.

In an implementation, the master node may write the transactions as a block on the distributed ledger 42, for example using blockchain API 206.

In an operation 316, the master node may signal completion of the combination. For instance, the master node may transmit a blockchain transaction indicating its state (that it combined the local parameters into the final parameters). The blockchain transaction may also indicate where and/or how to obtain the final parameters for the iteration. In some instances the blockchain transaction may be written to the distributed ledger 42.

In an operation 318, each participant node 10 may obtain and apply the final parameters on their local models. For example, a participant node 10 may inspect its local copy of the distributed ledger 42 to determine that the state of the master node indicates that the final parameters are available. The participant node 10 may then obtain the final parameters.

In an operation 320, the master node may signal completion of an iteration and may relinquish control as master node for the iteration. Such indication may be encoded in the distributed ledger 42 for other participant nodes 10 to detect and transition into the next state (which may be either applying the model to its particular implementation and/or readying for another iteration.

By recording states on the distributed ledger 42 and related functions, the blockchain network 110 may effectively manage node restarts and dynamic scaling as the number of participant nodes 10 available for participation constantly changes, such as when nodes go on-and-offline, whether because they are turned on/turned off, become connected/disconnected from a network connection, and/or other reasons that node availability can change.

Use of the distributed ledger 42 and related functions helps to achieve state integrity by ensuring global visibility of state data and deterministic state transition through the smart contracts 46. It should be noted that the processing operations of FIG. 6 may be repeated until the parameters converge.

Figure 4:
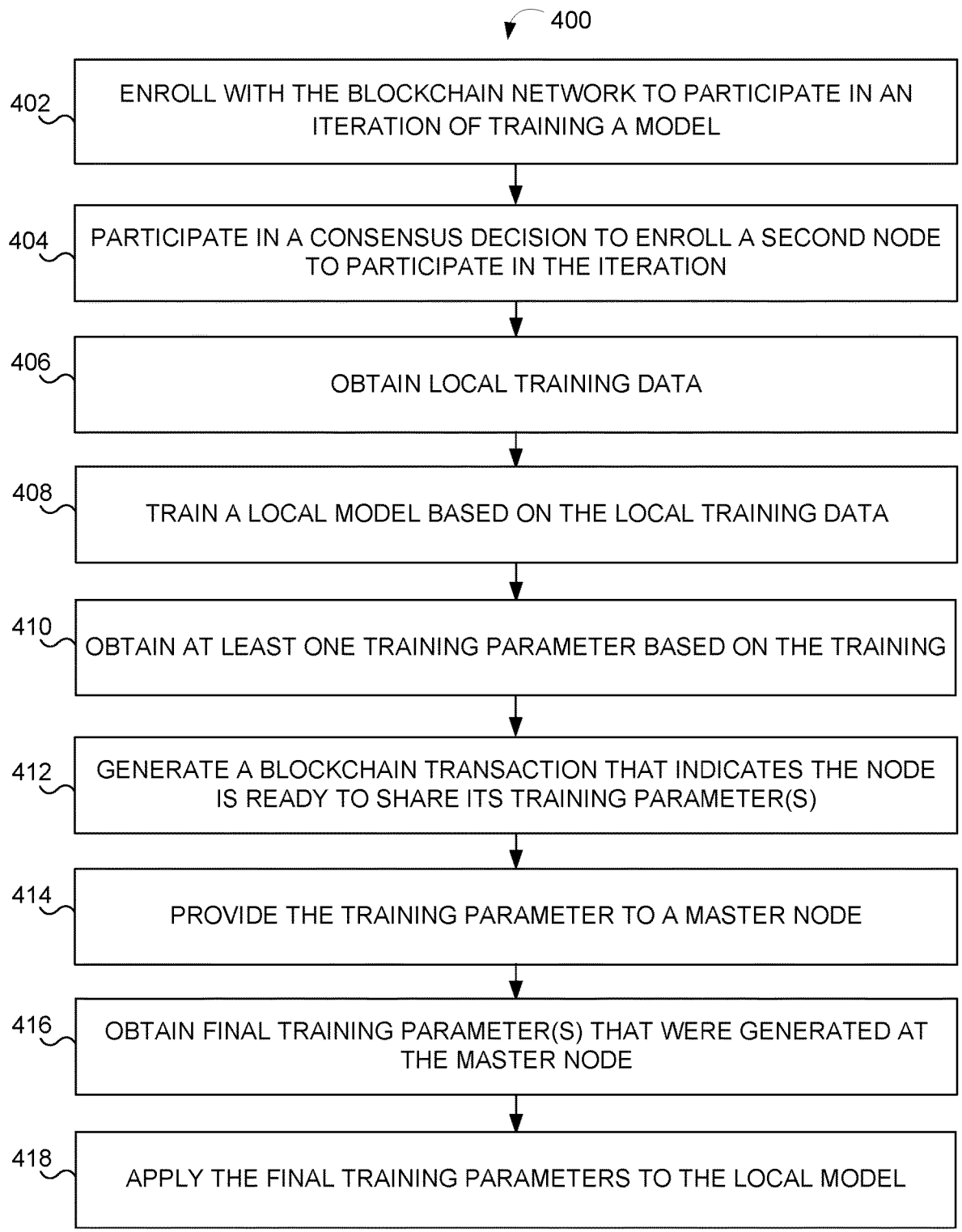
FIG. 4 illustrates an example of a process at a node that participates in an iteration of model building using blockchain, according to an example implementation of the invention.

FIG. 4 illustrates an example of a process 400 at a node that participates in an iteration of model building using blockchain, according to an implementation of the invention.

In an operation 402, a participant node 10 may enroll with the blockchain network 110 to participate in an iteration of model training. At the start of a given iteration, a node may consult a registry structure that specifies a Model identifier (representing the model being built), maximum number of iterations for the model, current iteration, minimum number of participants for model building, an array of participant identifiers and majority criterion, and/or other model building information. This structure may be created when the system is set up for decentralized machine learning. Some or all of the parameters of this structure may be stored as a smart contract.

The node may first check whether a model identifier exists. If it does not exist it will create new entry in the structure. Due to the serializing property of blockchain transactions, the first node that creates the new entry will win (because no other nodes compete to create entries at this point).

If the model identifier does exist, then the node may enroll itself as a participant, and model building may proceed as described herein once the minimum number of participants is achieved.

In an operation 404, the participant node 10 may participate in a consensus decision to enroll a second node that requests to participate in the iteration. The consensus decision may be based on factors such as, for example, one or more of the requesting node's credentials/permission, current state, whether it has stale data, and/or other factors.

In an operation 406, the participant node 10 may obtain local training data. The local training data may be accessible at the participant node 10, but not accessible to the other participant nodes 10. Such local training data may be generated at the participant node 10 (e.g., such as from sensors 12, actuators 14, and/or other devices 16), input at the participant node 10 (e.g., such as from a user), or otherwise be accessible to the participant node 10. It should be noted that at this point, the participant node 10 will be training on its local training data after it has updated it local training parameters to the most recent merged parameters from the most recent iteration (the iteration just prior to the current iteration) of model training.

In an operation 408, the participant node 10 may train a local model based on the local training dataset. Such model training may be based on the machine learning framework 24 that is executed on the local training dataset.

In an operation 410, the participant node 10 may obtain at least one local training parameter. For example, the local training parameter may be an output of model training at the participant node 10.

In an operation 412, the participant node 10 may generate a blockchain transaction that indicates it is ready to share its local training parameter(s). Doing so may broadcast to the rest of the blockchain network 110 that it has completed its local training for the iteration. The participant node 10 may also serialize its training parameter(s) for sharing.

In an operation 414, the participant node 10 may provide its training parameter(s) to a master node, which is elected by the participant node 10 along with one or more other participant nodes 10 in the blockchain network 110. It should be noted that the participant node 10 may provide its training parameter(s) by transmitting them to the master node or otherwise making them available for retrieval by the master node via peer-to-peer connection or other connection protocol.

In an operation 416, the participant node 10 may obtain final training parameters that were generated at the master node, which generated the final training parameters based on the training parameter(s) provided by the participant node 10 and other participant nodes 10 for the iteration as well.

In an operation 418, the participant node 10 may apply the final training parameters to the local model and update its state (indicating that the local model has been updated with the current iteration's final training parameters).

Figure 5:
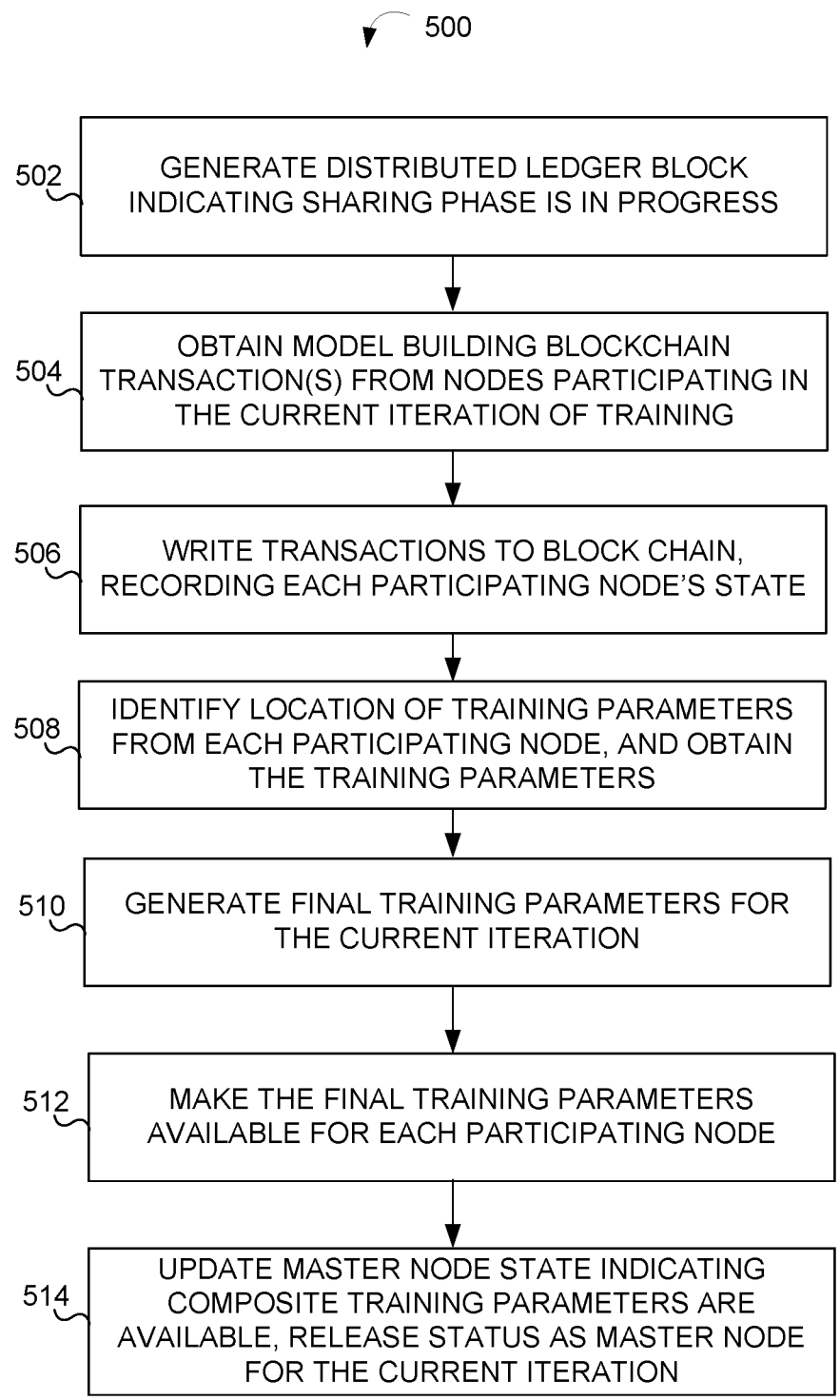
FIG. 5 illustrates an example of a process at a master node elected to generate final training parameters based on training parameters from participant nodes in an iteration of model building using blockchain, according to an example implementation of the invention.

FIG. 5 illustrates an example of a process 500 at a master node elected to generate final training parameters based on training parameters from participant nodes in an iteration of model building using blockchain, according to an implementation of the invention.

In an operation 502, the master node may generate a distributed ledger block that indicates a sharing phase is in progress. For example, the master node may write distributed ledger block that indicates its state. Such state may indicate to participant nodes 10 that the master node is generating final parameters from the training parameters obtained from the participant nodes 10.

In an operation 504, the master node may obtain blockchain transactions from participant nodes 10. These transactions may each include indications that a participant node 10 is ready to share its local training parameters and/or information indicating how to obtain the local training parameters.

In an operation 506, the master node may write the transactions to a distributed ledger block, and add the block to the distributed ledger 42.

In an operation 508, the master node may identify a location of training parameters generated by the participant nodes 10 that submitted the transactions. The master node may obtain these training parameters, which collectively represent training parameters from participant nodes 10 that each performed local model training on its respective local training dataset.

In an operation 510, the master node may generate final training parameters based on the obtained training parameters. For example, the master node may merge the obtained training parameters to generate the final training parameters.

In an operation 512, the master node may make the final training parameters available to the participant nodes 10. Each participant node 10 may obtain the final training parameters to update its local model using the final training parameters.

In an operation 514, the master node may update its state to indicate that the final training parameters are available. Doing so may also release its status as master node for the iteration and signal that the iteration is complete. In some instances, the master node may monitor whether a specified number of participant nodes and/or other nodes (such as nodes in the blockchain network 110 not participating in the current iteration) have obtained the final training parameters and release its status as master node only after the specified number and/or percentage has been reached. This number or percentage may be encoded in the smart contracts 46.

Figure 6:
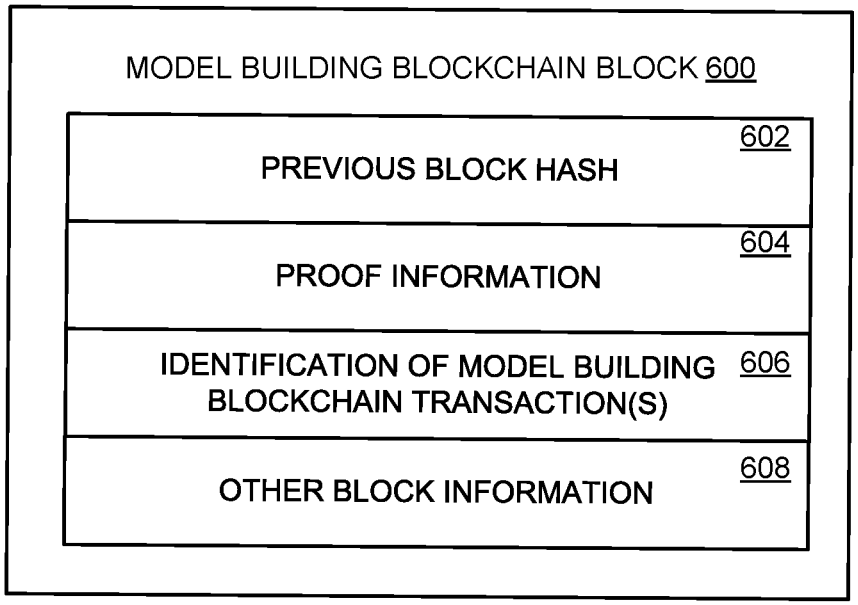
FIG. 6 illustrates an example of a model building blockchain block, according to an example implementation of the invention.

FIG. 6 illustrates an example of a model building blockchain block 600 (also referred to as block 600), according to an implementation of the invention. During a given iteration, a master node may write transactions to block 600, which is added to distributed ledger 42. The transactions may be submitted participant nodes 10, including the master node, in order to broadcast status information to the blockchain network 110. The block 600 may include a previous block hash 602, proof information 604, identification of model building blockchain transactions 606, and/or other block information 608.

The particular format and configuration of block 600 may be dependent on the blockchain platform used to implement the blockchain network 110. The previous block hash 602 may include a value of a hash of a previous block. As such, the block 600 may be linked to another (previous) block in the distributed ledger 42. The proof information 604 may include, for example, a proof of stake or proof of work, depending on which type of blockchain is implemented. For proof of stake implementations, the proof information may include evidence that a master node that generated the block 600 was elected to be the master node. Such information may include node credential information (such as an identifier), vote information indicating the master node was elected, and/or other information that indicates a proof of stake of the master node.

In proof of work implementations, the proof information may indicate a hash value or other challenge response from the master node that indicates that the master node (such as through the blockchain API 206) actually performed work required to write the block 600. The block 600 may include an identification of transactions 606 that are being written to the block 600 (which is added to the distributed ledger 42). The transaction data—and the block 600—may therefore be used to coordinate decentralized machine learning across nodes 10. This is because each node 10 may have a copy of the distributed ledger 42 and is able to monitor the progress of an iteration of machine learning. For example, the block 600 may record states of participant nodes 10 broadcast by these nodes to indicate they are ready to share their local parameters. In some instances, the transactions may indicate a state of the master node.

Figure 7:
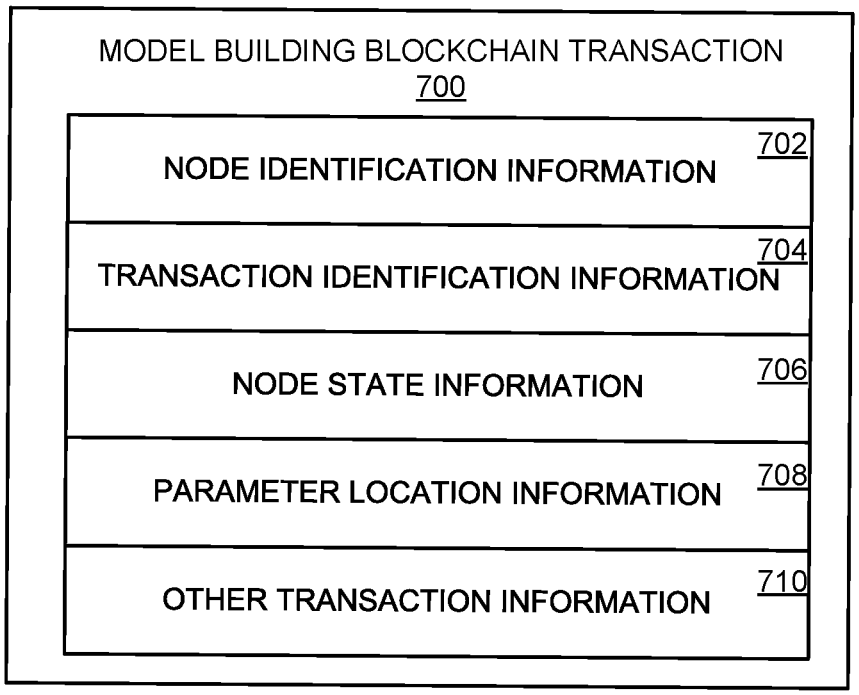
FIG. 7 illustrates an example of a model building blockchain transaction, according to an example implementation of the invention.

FIG. 7 illustrates an example of a model building blockchain transaction 700 (also referred to as "transaction 700"), according to an implementation of the invention. Transaction 700 may include node identification information 702, transaction identification information 704, node state information 706, parameter location information 708, and/or other transaction information 710.

The node identification information 702 may include an identification of a participant node 10 that provided the transaction 700. The transaction identification information 704 may uniquely identify the transaction from other transactions. The node state information 706 may include information that indicates a state of a participant node 10 that generated the transaction. The parameter location information 708 may include a location of where or otherwise how to obtain the parameter that is ready for sharing by the participant node 10 that generated the transaction. Other transaction information 710, such as a timestamp of when the transaction was created, may be stored as well.

Figure 8B:
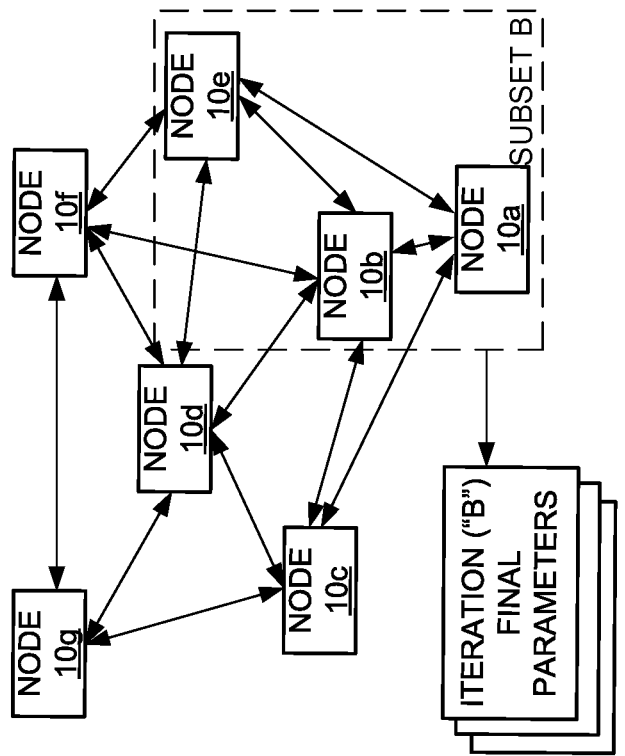
FIG. 8B illustrates use of a second subset of all available nodes in a blockchain network for a training iteration of decentralized model building, according to an example implementation of the invention.
Figure 8A:
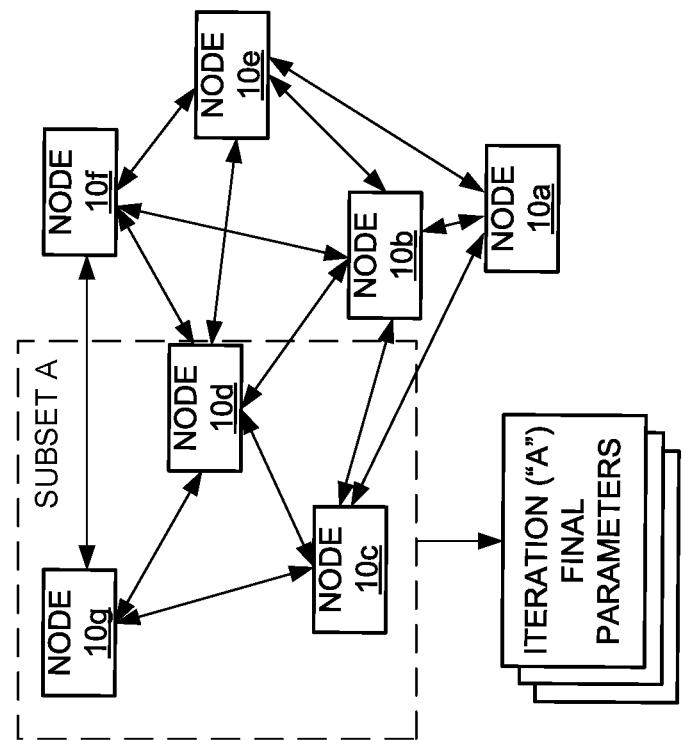
FIG. 8A illustrates use of a first subset of all available nodes in a blockchain network for a training iteration of decentralized model building, according to an example implementation of the invention.

FIG. 8A illustrates use of a first subset of all available nodes in a blockchain network for a training iteration of decentralized model building, according to an implementation of the invention. FIG. 8A illustrates schematically that only a subset of nodes 10 of the blockchain network 110 might participate in an iteration of model training (illustrated as Iteration "A"), the result of which is generation of final parameters from iteration "A." FIG. 8B illustrates use of a second subset of all available nodes in a blockchain network for a training iteration of decentralized model building, according to an implementation of the invention. FIG. 8B illustrates schematically that another subset of nodes 10 of the blockchain network 110 might participate in another iteration of model training (illustrated as Iteration "B"), the result of which is generation of final parameters from iteration "B." Other numbers and identities of nodes 10 may participate in other iterations, including all of the nodes 10 in the blockchain network 110. As such, the system may scale and dynamically adjust the nodes 10 participating in an iteration of model training based on the topology or availability of nodes 10.

As used herein throughout, the terms "model building" and "model training" are used interchangeably to mean that machine learning on training datasets is performed to generate one or more parameters of a model.

Although illustrated in FIG. 1 as a single component, a node 10 may include a plurality of individual components (e.g., computer devices) each programmed with at least some of the functions described herein. The one or more processors 20 may each include one or more physical processors that are programmed by computer program instructions. The various instructions described herein are provided for illustrative purposes. Other configurations and numbers of instructions may be used, so long as the processor(s) 20 are programmed to perform the functions described herein.

Furthermore, it should be appreciated that although the various instructions are illustrated in FIG. 1 as being co-located within a single processing unit, in implementations in which processor(s) 20 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 20 may be programmed by one or more additional instructions that may perform some or all of the functionality attributed herein to one of the instructions.

The various instructions described herein may be stored in a storage device 40, which may comprise random access memory (RAM), read only memory (ROM), and/or other memory. The storage device may store the computer program instructions (e.g., the aforementioned instructions) to be executed by processor 20 as well as data that may be manipulated by processor 20. The storage device may comprise one or more non-transitory machine-readable storage media such as floppy disks, hard disks, optical disks, tapes, or other physical storage media for storing computer-executable instructions and/or data.

The distributed ledger 42, transaction queue, models 44, smart contracts 46, local parameters, final parameters, local training datasets, and/or other information described herein may be stored in various storage devices such as storage device 40. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The nodes 10 illustrated in FIG. 1 may be coupled to other participant nodes 10 via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG.

1, as well as in other drawing Figures, different numbers of entities than those depicted may be used. Furthermore, according to various implementations, the components described herein may be implemented in hardware and/or software that configure hardware.

The various processing operations and/or data flows depicted in FIGS. 3-5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system of decentralized machine learning via a plurality of iterations of training, the system comprising a first physical computing node of a blockchain network comprising a plurality of physical computing nodes, the first physical computing node programmed to:
    enroll with the blockchain network to participate in a first iteration of training a machine-learned model;
    participate in a consensus decision to enroll a second physical computing node of the blockchain network to participate in the first iteration;
    obtain a local training dataset accessible locally at the first physical computing node, but not accessible at other ones of the plurality of physical computing nodes;
    train a local model based on the local training dataset during the first iteration;
    generate a first training parameter based on the local model;
    generate a blockchain transaction comprising an indication that the first physical computing node is ready to share the first training parameter;
    transmit the first training parameter to a master node that generates a new transaction to be added as a ledger block to each copy of a distributed ledger based on the indication;
    obtain, from the blockchain network, a final training parameter generated by the master node based on merging the first training parameter generated by the first physical computing node and a second training parameter generated at, and shared from, the second physical computing node; and
    apply the final training parameter to the local model.

2. The system of claim 1, wherein the first physical computing node is further programmed to:
  participate in a further consensus decision to enroll physical computing nodes of the blockchain network to participate in a second iteration of training the machine-learned model, wherein the further consensus decision excludes the second physical computing node from the second iteration based on a rule in a smart contract.

3. The system of claim 1, wherein the final training parameter generated by the master node is based on applying an algorithm on the first training parameter and the second training parameter.

4. The system of claim 1, further comprising:
  the master node programmed to:
    generate a transaction that includes an indication that the master node has generated one or more final training parameters including the final training parameter generated based on merging the first training parameter and the second training parameter;
    cause the transaction to be written as a block in the distributed ledger;
    release a status of the master node as a master, which permits entry into a second iteration of training the machine-learned model with a different master node; and
    make the one or more final training parameters available to the plurality of physical computing nodes, including a physical computing node not enrolled in the first iteration of training the machine-learning model.

5. The system of claim 4, wherein the first physical computing node is further programmed to:
  monitor its copy of the distributed ledger; and
  determine that the master node has generated the one or more final training parameters based on the block in the distributed ledger.

6. The system of claim 4, wherein the first physical computing node is further programmed to:
  participate in a consensus decision with other physical computing nodes to elect the master node from among the plurality of physical computing nodes.

7. The system of claim 1, wherein the first physical computing node is further programmed to:
  obtain one or more rules from a smart contract encoded with the first physical computing node; and
  determine, as part of the consensus decision, whether the second physical computing node has permission to participate in the first iteration based on the one or more rules.

8. The system of claim 7, wherein the first physical computing node is further programmed to:
  determine a current state of the second physical computing node; and
  determine whether the current state is a permissible state for participation in the first iteration based on the one or more rules.

9. The system of claim 1, further comprising a third physical computing node in the blockchain network that did not participate in the first iteration, the third physical computing node programmed to:
  receive a current copy of the distributed ledger after the first iteration is complete;
  obtain the final training parameter; and
  apply the final training parameter to a local model at the third physical computing node.

10. A method of decentralized machine learning via a plurality of iterations of training, the method comprising:
  enrolling, by a first physical computing node of a blockchain network comprising a plurality of physical computing nodes, with the blockchain network to participate in a first iteration of training a machine-learned model;
  participating, by the first physical computing node with another physical computing node in the blockchain network, in a consensus decision to enroll a second physical computing node of the blockchain network to participate in the first iteration;
  obtaining, by the first physical computing node, a local training dataset accessible locally at the first physical computing node, but not accessible at other ones of the plurality of physical computing nodes;
  training, by the first physical computing node, a first local model based on the local training dataset during the first iteration;
  generating, by the first physical computing node, a first training parameter based on the local model;
  generating, by the first physical computing node, a blockchain transaction comprising an indication that the first physical computing node is ready to share the first training parameter;
  transmitting, by the first physical computing node, the first training parameter to a master node that generates a ledger block to be added to each copy of a distributed ledger;
  obtaining, by the first physical computing node from the blockchain network, a final training parameter generated by the master node based on merging the first training parameter generated by the first physical computing node and a second training parameter generated at, and shared from, the second physical computing node; and
  applying, by the first physical computing node, the final training parameter to the local model.

11. The method of claim 10, further comprising participating, by the first physical computing node with another physical computing node in the blockchain network, a further consensus decision to enroll physical computing nodes of the blockchain network to participate in a second iteration of training the machine-learned model, wherein the further consensus decision excludes the second physical computing node from the second iteration based on a rule in a smart contract.

12. The method of claim 10, wherein the final training parameter generated by the master node is based on applying an algorithm on the first training parameter and the second training parameter.

13. The method of claim 10, further comprising:
  generating, by the master node, a block that includes an indication that the master node has generated one or more final training parameters including the final training parameter generated based on merging the first training parameter and the second training parameter;
  writing, by the master node, the block to the distributed ledger;
  releasing, by the master node, a status of the master node as a master, which permits entry into a second iteration of training the machine-learned model with a different master node; and
  making, by the master node, the one or more final training parameters available to the plurality of physical computing nodes, including a physical computing node not enrolled in the first iteration of training the machine-learning model.

14. The method of claim 13, further comprising:
monitoring, by the first physical computing node, its copy of the distributed ledger;
determining, by the first physical computing node, that the master node has generated the one or more final training parameters based on the block in the distributed ledger.

15. The method of claim 13, wherein participating in the consensus decision comprises:
obtaining, by the first physical computing node, one or more rules from a smart contract encoded with the first physical computing node; and
determining, by the first physical computing node, whether the second physical computing node has permission to participate in the first iteration based on the one or more rules.

16. The method of claim 10, further comprising:
training, by the master node that is a physical computing node in the blockchain network, a local model of the master node based on a local training dataset at the master node;
generating, by the master node, a third training parameter based on the local model of the master node;
generating, by the master node, the final training parameter based on merging the first training parameter, the second training parameter, and the third training parameter; and
sharing, by the master node with the plurality of physical computing nodes, the final training parameter generated based on merging the first training parameter, the second training parameter, and the third training parameter.

17. A non-transitory machine-readable storage medium comprising instructions executable on a processor of a first physical computing node of a blockchain network comprising a plurality of physical computing nodes, the instructions upon execution causing the first physical computing node to:
enroll with the blockchain network to participate in a first iteration of training a machine-learned model;
participate in a consensus decision to enroll a second physical computing node of the blockchain network to participate in the first iteration;
obtain a local training dataset accessible locally at the first physical computing node, but not accessible at other ones of the plurality of physical computing nodes;
train a local model based on the local training dataset during the first iteration;
generate a first training parameter based on the local model;
broadcast an indication that the first physical computing node is ready to share the first training parameter;
transmit the first training parameter to a master node that generates a ledger block to be added to each copy of a distributed ledger;
obtain, from the blockchain network, a final training parameter generated by the master node based on merging the first training parameter and a second training parameter generated at, and shared from, the second physical computing node; and
apply the final training parameter to the local model.

18. The non-transitory machine-readable storage medium of claim 17, wherein the instructions upon execution cause the first physical computing node to:
participate in a further consensus decision to enroll physical computing nodes of the blockchain network to participate in a second iteration of training the machine-learned model, wherein the further consensus decision excludes the second physical computing node from the second iteration based on a rule in a smart contract.

19. The system of claim 1, further comprising:
the master node that is a physical computing node in the blockchain network, the master node programmed to:
train a local model of the master node based on a local training dataset at the master node;
generate a third training parameter based on the local model of the master node;
generate the final training parameter based on merging the first training parameter, the second training parameter, and the third training parameter; and
share, with the plurality of physical computing nodes, the final training parameter generated based on merging the first training parameter, the second training parameter, and the third training parameter.

20. The system of claim 19, wherein the merging of the first training parameter, the second training parameter, and the third training parameter comprises computing an average based on the first training parameter, the second training parameter, and the third training parameter.

* * * * *